April 7, 1953     F. H. DRAKE ET AL     2,634,069
ANTIVIBRATION MOUNTING
Filed April 8, 1947
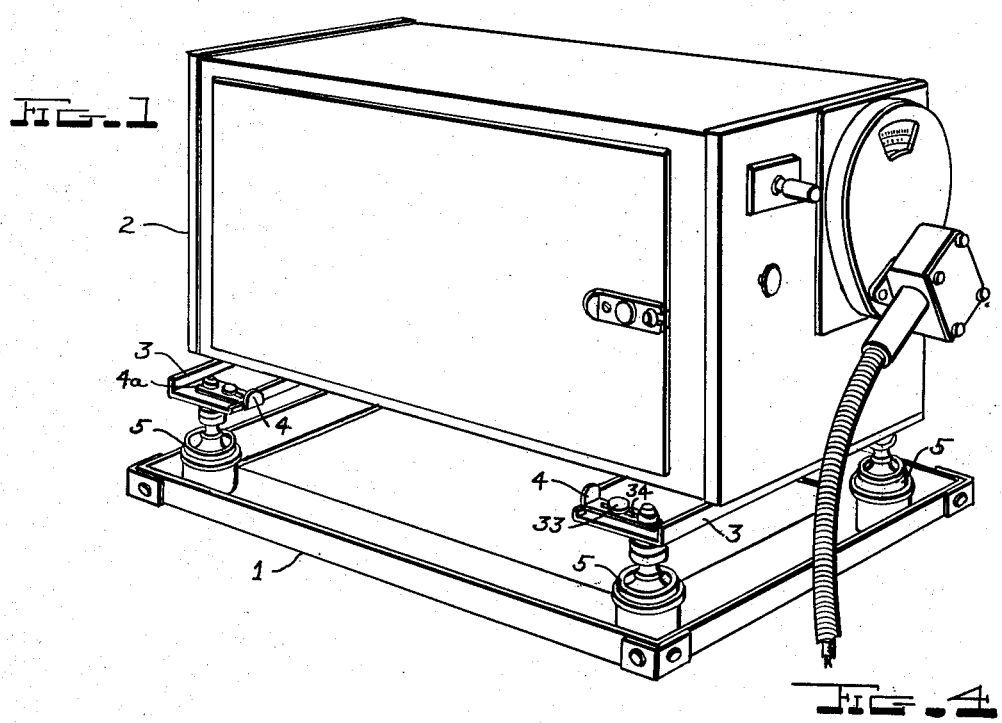
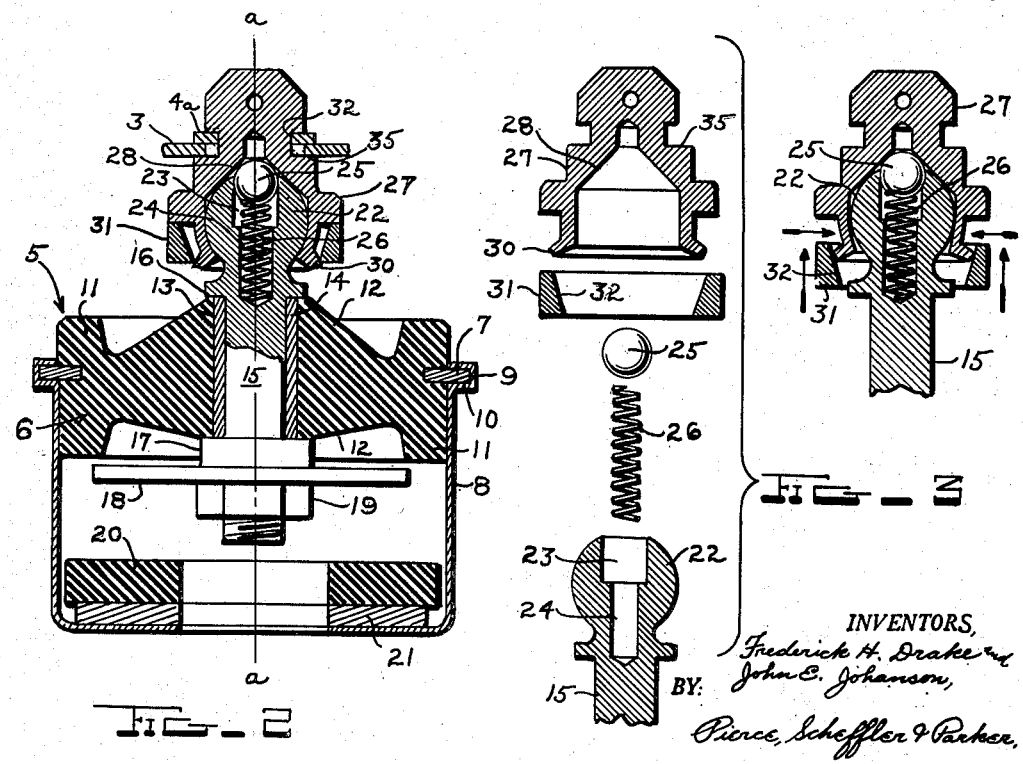
INVENTORS,
Frederick H. Drake
John E. Johanson,
BY: Pierce, Scheffler & Parker,
ATTORNEYS.

Patented Apr. 7, 1953

2,634,069

UNITED STATES PATENT OFFICE 2,634,069

ANTIVIBRATION MOUNTING

Frederick H. Drake and John E. Johanson, Boonton, N. J., assignors to Aircraft Radio Corporation, Boonton, N. J., a corporation of New Jersey Application April 8, 1947, Serial No. 740,242

5 Claims. (Cl. 248—24)

This invention relates to supports and in particular to those designed for the protection of equipment from damage due to shock and vibration.

In mounting various types of equipment such as radio receivers and transmitters, measuring instruments, etc., that include fragile, delicate and sensitive parts, it is often found necessary to provide a vibration and shock absorbing unit in the mounting to prevent damage to the parts. The shock and vibration problem is particularly vexing where equipment is installed in aircraft, trains, ships, tanks and other mobile craft where the vibrations and shocks reach a considerable magnitude and in addition are set up in a multitude of directions and planes.

In shock mounts heretofore developed, systems of springs have been devised for supporting the equipment in a yielding manner; other shock mounts have included various arrangements of blocks of rubber or other like material interposed between the support and equipment to provide a yielding connection therebetween. The spring systems become exceedingly complex when designed to absorb shock in different planes and make it rather difficult to install and remove the equipment from the support. Rubber mountings are more simple but these so far developed have in general been unsatisfactory for cushioning the equipment against shocks and vibrations originating in a multitude of planes. This invention relates to mountings of the latter type and has for a general object to provide a mounting that permits the equipment supported thereby to yield freely in a vertical plane as well as in any direction in a horizontal plane with respect to the plane of the support.

Another object is to provide an anti-shock mounting for equipment in which the latter is supported at a plurality of points, each supporting point including an anti-shock unit capable of yielding universally. Another object is to provide an anti-shock mounting unit comprising a body of yieldable material to which is secured a connection stud containing a ball and socket joint that enables the stud to tilt about its axis as well as move in the plane of the axis. Another object is to provide an anti-shock mounting including a self-aligning ball and socket connection. Still another object is to provide an improved ball and socket assembly and an improved method of making it.

The foregoing and other objects and advantages to be derived will become more apparent from the following detailed description when considered with the accompanying drawings which illustrate a preferred embodiment of the invention as applied to a four-point support for a radio receiver.

In the drawings, Fig. 1 is a perspective view of the complete mount with the radio receiver secured thereto; Fig. 2 is a vertical central section through one of the shock-absorbing supports; and Figs. 3 and 4 are views illustrating the method of assembling the self-aligning ball and socket connection.

Referring now to the drawings, numeral 1 designates a rectangular frame of angle aluminum for supporting an aircraft radio receiver 2, the frame being adapted to be secured permanently in place in a horizontal position in the aircraft. Transverse channels 3 are secured across each end of the receiver cabinet and a slidable clip 4 is provided at each end of each of the channels for connecting and supporting the latter on an anti-vibration mount 5 fastened at each corner of the frame.

As seen in Fig. 2, each of the shock absorbing mounts 5 includes a body member of yieldable material, preferably a disc-like body 6 of rubber having an annular metallic disc 7 partly imbedded in its peripheral wall by which the rubber body 6 is carried at the upper end of a cylindrical metal can 8, the peripheral wall of the latter being provided for the purpose with a recess 9 that provides a shoulder 10 for receiving and supporting the disc 7 and hence also body 6. The four cans 8 are welded or otherwise secured to the frame corners.

The rubber body 6 includes an outer double flanged section 11 and a central double coned section 12 that enables the body to yield vertically along axis a—a when subjected to a vertical load and also to tilt about such axis under certain conditions when subjected to loads applied transversely of the axis. Both tilting and vertical deformations of the rubber body 6 take place at the circle defining the junction of the flanged and coned sections at which the body has its minimum thickness.

An axial aperture 13 through the conical section 12 is lined with a metallic bushing 14 through which is inserted a threaded stud 15. A shoulder 16 on the stud bears against the upper end of bushing 14, and a pair of washers 17, 18 carried on the stud together with nut 19 fasten the stud tightly in place to bushing 14 and body 6. The upper washer 17 bears against the lower end of bushing 14 and the lower washer 18, which is much larger in diameter, is provided as a safety device in case of rubber failure to engage the top surface of an annular disc 20 also of rubber which rests on an annular metallic disc 21 in the bottom of can 8. Disc 20 and washer 18 constitute a cushion stop and damping means to limit deformation of the shock absorbing member 6 should the latter be subjected to abnormally severe shocks or vibrations.

The upper end of stud 15 terminates in a ball 22 having a pair of communicating axial recesses 23, 24 of stepped diameters for receiving a smaller ball 25 and compression spring 26 respectively. A socket member 27 surrounding the ball 22 contains a coned surface 28 against which the smaller ball 25 is pressed by the loading spring 26. Surface friction between ball 22 and socket 27 is held to a minimum and hence the upward thrust of ball 25 against the coned surface 28 is sufficient to maintain the axis of the socket 27 in alignment with the longitudinal axis a—a through the stud 15 and ball 22. The ball and socket joint consisting of members 22, 27 can thus be said to be "self aligning."

The method of assembling the ball and socket joint is shown in Figs. 3 and 4. Before assembly, the lower portion of socket 27, which is preferably made of brass, is seen to be cylindrical with a bottom tapered flange 30, the opening being just large enough to admit ball 22. In assembling the joint, spring 26 and ball 25 are first inserted into the recesses in ball 22 and the latter is then pushed into the cylindrical opening in socket 27. A ring 31 of steel or other like material having a hardness factor greater than that of the material from which the socket 27 is made, and which is provided with a tapered inner surface 32 is pressed upwardly over the brass flange 30 as shown in Fig. 4 and compresses the lower end of socket 27 around the ball 22 to thus deform and hold the socket around the ball. As shown in Fig. 2, the lower edge of ring 31 snaps over the upper edge of flange 30 when fully in place and thus locks ring 31 firmly on the socket. As previously explained, no appreciable surface friction can exist between socket 27 and ball 22 and hence the dimensions of these members and those of the flange 30 and ring 31 must be closely controlled to prevent any binding between the ball and socket during the assembling operation.

For connecting or disconnecting the radio receiver 2 and frame 1, the upper ends of the socket members 27 on each of the four studs 15 extend through openings at each end of the channels 3 and are grooved at 32 to receive the forked ends 4a of the slidably mounted clips 4 and thus hold the sockets 27 rigidly to the channels 3. The clips are held in sliding relation with respect to the channels 3 by means of headed pins 33 secured to the channels, the pins being passed through elongated slots 34 in the clips to permit the clips to be slid back and forth.

The anti-vibration mounting which has been described can be said to have a universal action and is particularly well suited for absorbing shocks and vibrations imparted to the support frame 1 in the vertical plane through the axis a—a of the yieldable body 6 and stud 15 as well as shocks or vibrations incoming to the frame from any direction in the horizontal plane. As to vibrations in a vertical plane, these are efficiently absorbed by limited deformation of the yieldable body 6 in the vertical plane, the deformation taking place at the junction line between the flanged and conical sections 11, 12. In the case of vibrations or shocks incoming to the support from any direction in a horizontal plane, the universal action inherent in the ball and socket joint at each of the four points of connection between the frame 1 and channels 3 allows the studs 15 to tilt about their respective vertical axes accompanied by corresponding deformation of the resilient body members 6. Thus the improved universal mounting permits the radio receiver 2 to move freely in the vertical plane as well as in any direction in the horizontal plane, and the receiver is therefore efficiently cushioned against damage from shock and vibration irrespective of the direction or directions from which these may come.

The self-aligning feature of the ball and socket joints by which the socket member of each joint is maintained in vertical alignment simplifies installation of the receiver 2 on the support 1; since all socket members 27 are thus maintained in alignment with the holes in the ends of the supporting channels 3, the latter with the receiver 2 fixed thereto may be easily and quickly lowered on the sockets 27, coming to rest on the shouldered portions 35 of the sockets. Clips 4 are then slid into locking position in the grooves 32 and the installation is complete. Without the self-aligning feature, installation of receiver 2 would be rendered somewhat more difficult, for one person would be required to hold the receiver and another would probably be necessary to line up each socket member with its complementary hole in the channels 3.

In conclusion, it is to be understood that while the construction which has been described and illustrated is to be preferred, various changes in the arrangements of the principal components as well as their details of construction may be made without departing from the spirit and scope of the invention as defined in the appended claims.

We claim:

1. A ball and socket universal joint comprising a ball member, said ball member being provided with an axial recess receiving a spring loaded aligning ball, and a socket member surrounding said ball member, said socket member including an interior surface concentric with the socket axis and which serves as a seat for said aligning ball to thereby maintain said ball and socket members in axial alignment.

2. A ball and socket universal joint comprising a ball member, said ball member being provided with an axial recess receiving a spring loaded aligning ball, and a socket member receiving said ball member, said socket member including an axially aligned conical seat defining a bearing surface against which is pressed said aligning ball to thereby maintain said ball and socket members in axial alignment.

3. A ball and socket universal joint comprising a ball member, said ball member being provided with an axial recess receiving a spring loaded aligning ball, and a socket member including a tapered seat concentric with the socket axis and engaging said aligning ball to thereby urge said socket member into axial alignment with said ball member.

4. An anti-vibration mounting for apparatus comprising at least three body members of yieldable material secured in spaced relation to provide a stable platform support for said apparatus, a connecting stud secured to and upstanding from each of said body members, each said stud being yieldable along its axis and tiltable about said axis through corresponding deformation of the yieldable member to which it is secured, a ball and socket universal joint upstanding upon the upper end of each stud, the ball member of each said joint being rigid with said stud, and means detachably connecting the socket member of each joint rigidly to said apparatus comprising a clip secured to said apparatus and provided with a bifurcated end slidable into locking engagement with a shouldered portion on said socket member.

5. A mounting as defined in claim 4 wherein the several ball and socket joints are each rendered self-aligning by the inclusion of a spring loaded aligning ball partially seated within an axial recess in the ball member and which bears against a co-axial tapered surface provided in the socket member.

FREDERICK H. DRAKE.
JOHN E. JOHANSON.

REFERENCES CITED

The following references are of record in the file of this patent:

UNITED STATES PATENTS

| Number | Name | Date |
|---|---|---|
| 206,393 | Ellinger | July 30, 1878 |
| 553,265 | Scholer | Jan. 21, 1896 |
| 961,312 | Nolen et al. | June 14, 1910 |
| 1,084,155 | Lochman | Jan. 13, 1914 |
| 1,393,908 | Rudolph | Oct. 18, 1921 |
| 1,749,830 | Morris | Mar. 11, 1930 |
| 1,753,465 | Jacques | Apr. 8, 1930 |
| 1,755,210 | Dohner | Apr. 22, 1930 |
| 1,929,854 | Rogers | Oct. 10, 1933 |
| 1,951,860 | Cowles | Mar. 20, 1934 |
| 1,958,183 | Creveling | May 8, 1934 |
| 2,275,846 | Dunham | Mar. 10, 1942 |
| 2,275,966 | Julien | Mar. 10, 1942 |
| 2,281,973 | Healy | May 5, 1942 |
| 2,342,577 | Gehman | Feb. 22, 1944 |
| 2,353,300 | Dunn | July 11, 1944 |
| 2,375,105 | Hile | May 1, 1945 |
| 2,397,464 | Booth | Apr. 2, 1946 |
| 2,430,709 | Devorss | Nov. 11, 1947 |
| 2,491,229 | Taylor | Dec. 13, 1949 |